United States Patent
Young (10) Patent No.: US 8,672,785 B2
(45) Date of Patent: Mar. 18, 2014

(54) BLADE TENSIONER AND BRACKET FOR BLADE TENSIONER INCLUDING POCKET PIVOT FEATURE

(75) Inventor: James D. Young, Chesaning, MI (US)

(73) Assignee: Cloyes Gear and Products, Inc., Fort Smith, AR (US)

( * ) Notice: Subject to any disclaimer, the term of this patent is extended or adjusted under 35 U.S.C. 154(b) by 115 days.

(21) Appl. No.: 13/220,021

(22) Filed: Aug. 29, 2011

(65) Prior Publication Data
US 2012/0052997 A1 Mar. 1, 2012

Related U.S. Application Data

(60) Provisional application No. 61/378,306, filed on Aug. 30, 2010.

(51) Int. Cl.
*F16H 7/08* (2006.01)
*B23P 11/00* (2006.01)

(52) U.S. Cl.
USPC .......................................................... 474/111

(58) Field of Classification Search
USPC ............................................. 474/111; 29/428
See application file for complete search history.

(56) References Cited

U.S. PATENT DOCUMENTS

| | | | |
|---|---|---|---|
| 3,358,522 A | 12/1967 | Poyser et al. | |
| 4,155,342 A * | 5/1979 | Traweek | 124/16 |
| 5,055,088 A * | 10/1991 | Cradduck et al. | 474/111 |
| 5,425,680 A | 6/1995 | Young | |
| 5,730,674 A * | 3/1998 | Ott | 474/111 |
| 6,238,311 B1 * | 5/2001 | Cutting | 474/111 |
| 6,322,469 B1 * | 11/2001 | Markley | 474/111 |
| 6,406,391 B1 | 6/2002 | Ullein | |
| 6,524,202 B1 | 2/2003 | Tada et al. | |
| 6,572,502 B1 | 6/2003 | Young et al. | |
| 7,537,533 B2 * | 5/2009 | Wigsten et al. | 474/111 |
| 7,806,034 B1 * | 10/2010 | Lee et al. | 86/37 |
| 8,057,333 B2 * | 11/2011 | Haesloop | 474/111 |
| 2006/0100048 A1 | 5/2006 | Wake et al. | |
| 2012/0035010 A1 * | 2/2012 | Young | 474/111 |

FOREIGN PATENT DOCUMENTS

EP   1 655 510   5/2006

OTHER PUBLICATIONS

International Search Report mailed Nov. 15, 2011 for International application No. PCT/US2011/049520.
Written Opinion mailed Nov. 15, 2011 for International application No. PCT/US2011/049520.
International Preliminary Report on Patentability mailed Mar. 14, 2013 for International Application No. PCT/US2011/049520.

* cited by examiner

*Primary Examiner* — William E Dondero
*Assistant Examiner* — Mark K Buse
(74) *Attorney, Agent, or Firm* — Fay Sharpe LLP (57) ABSTRACT

A blade-type chain tensioner includes a bracket that includes a main wall, a ramp projecting from the main wall, and a pivot pocket including an internal concave pivot surface. A tensioner blade assembly is operatively connected to the bracket. The tensioner blade assembly includes a polymeric shoe and a spring connected to the shoe. The shoe includes a free end supported on the ramp, a pivot end engaged with the pivot pocket, and a central body that extends between the free end and the pivot end. The pivot end of the shoe includes a pivot barrel including an external convex pivot surface. The pivot barrel is engaged with the pivot pocket and the external pivot surface of the pivot barrel is slidably abutted with the internal pivot surface of the pivot pocket such that the pivot barrel is reciprocally angularly movable in the pivot pocket.

10 Claims, 11 Drawing Sheets

BLADE TENSIONER AND BRACKET FOR BLADE TENSIONER INCLUDING POCKET PIVOT FEATURE

CROSS-REFERENCE TO RELATED APPLICATION

This application claims priority from and benefit of the filing date of U.S. provisional application Ser. No. 61/378,306 filed Aug. 30, 2010, and the entire disclosure of said provisional application is hereby expressly incorporated by reference into the present specification.

BACKGROUND

The present invention relates generally to the automotive chain drive art and, more particularly, to a mechanical blade-type chain tensioner apparatus useful in confined spaces for applying a tensioning force to a chain traveling there past. Such blade-type chain tensioning devices include a chain engaging blade or shoe member, typically molded from a polymeric resinous or "plastic" material, having a metal spring installed therein to provide the shoe sub-assembly with the necessary rigidity and damping characteristics while taking advantage of the flexibility, low friction, and good wear properties of the plastic shoe.

Figures 1, 1A:
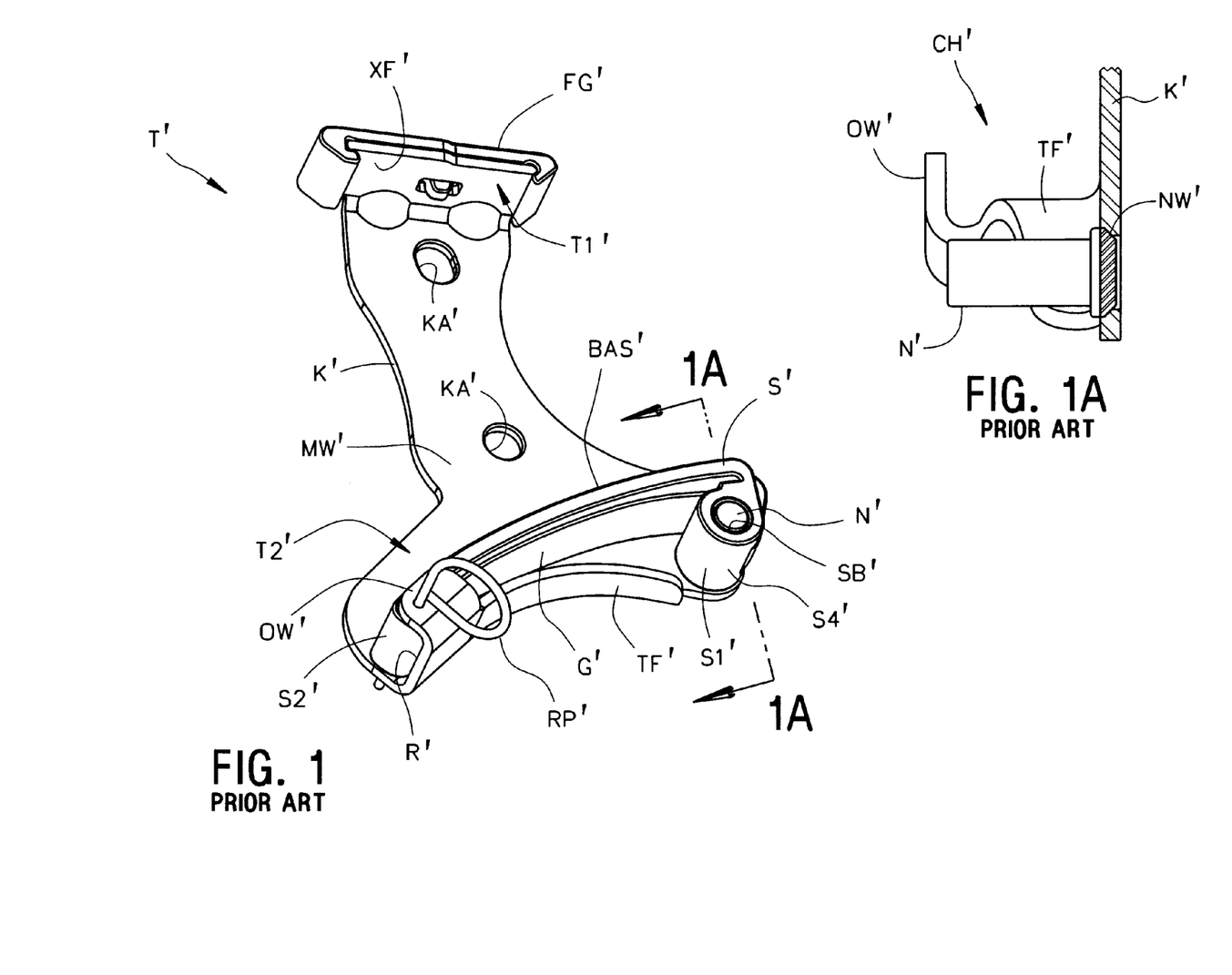
FIG. 1 shows a known blade-type tensioner apparatus comprising a bracket and a tensioner blade assembly secured to the bracket.
FIG. 1A is a section view taken at line 1A-1A of FIG. 1 (showing the bracket only without the blade assembly)
Figure 1B:
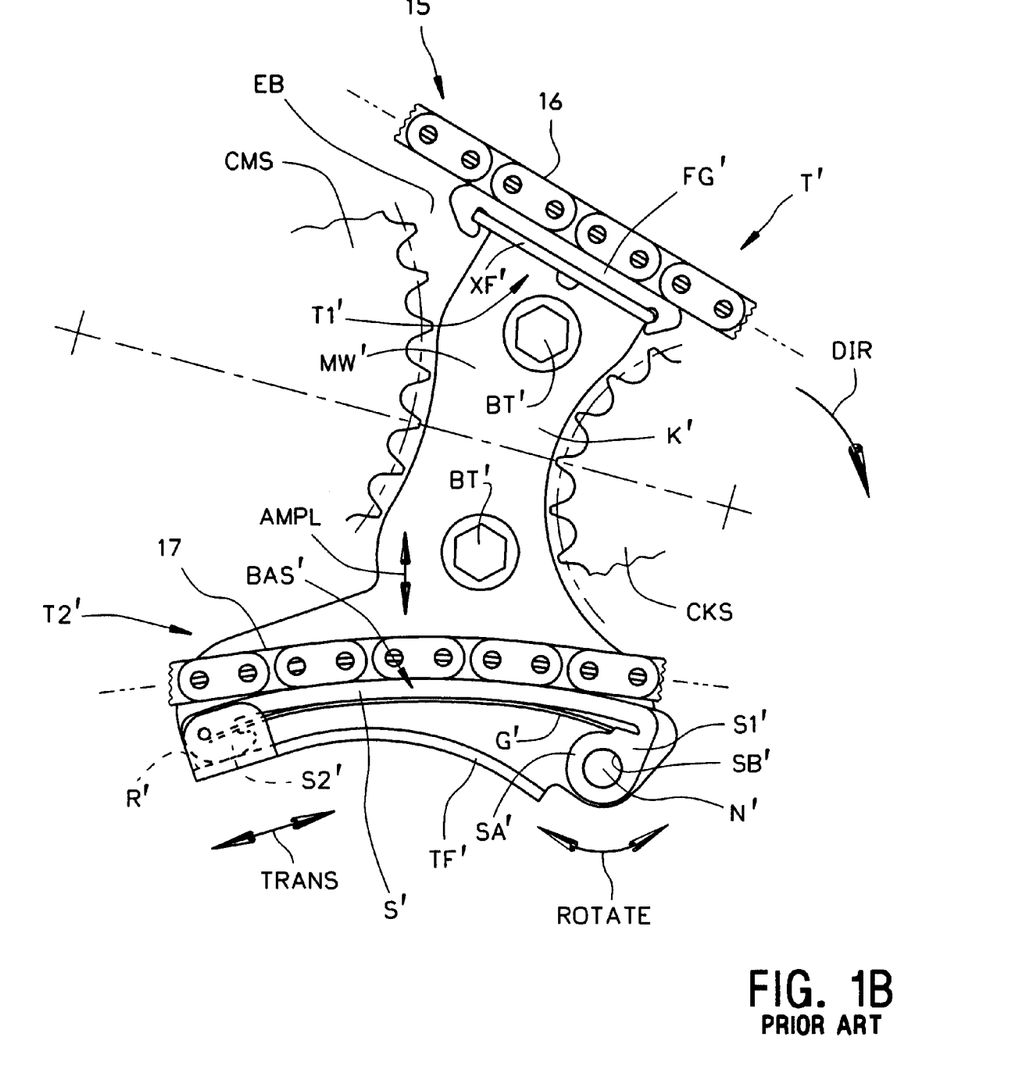
FIG. 1B shows the known tensioner apparatus operatively secured to an associated engine block as part of a chain drive system.

FIG. 1 shows a known blade-type tensioner apparatus T' comprising a bracket K' typically defined from a metal stamping and a tensioner blade assembly BAS' operably secured to the bracket. As shown in FIG. 1B, in use, the bracket K' is fixedly secured to an associated engine block EB as part of a chain drive system that is provided to phase or "time" the rotational position of one or more camshaft sprockets CMS with respect to the rotational position of the crankshaft sprocket CKS. One or more bolts or other fasteners BT' extend through mounting apertures KA' in a main wall MW' of the bracket K' and are threaded into the engine block EB or other associated support structure to fixedly secure the bracket K' in its operative position. A chain 15 such as a roller/bush chain or inverted tooth chain is engaged with the crankshaft sprocket CKS and the camshaft sprocket(s) CMS and phases/times the camshaft sprocket(s) to the crankshaft sprocket. The crankshaft sprocket CKS rotates in a direction DIR, and the chain 15 includes a taut strand portion 16 and a slack strand portion 17.

The illustrated known tensioner T' comprises an optional first portion T1' that comprises a fixed guide flange XF' that projects transversely from the main wall MW' of the bracket K' and that is engaged with and supports a fixed chain guide FG' defined from a polymeric resinous material. The fixed chain guide FG' includes a guide face that slidably engages and supports/guides the taut strand 16 of the chain as shown in FIG. 1B.

The tensioner T' further comprises a second portion T2' comprising the blade assembly BAS'. As part of the tensioner second portion T2', the bracket K' comprises a cold-headed steel or other pin N' that projects perpendicularly outward from the main wall MW' and that is welded or otherwise securely affixed to the main wall MW'. FIG. 1A is a section view taken at line 1A-1A of FIG. 1 (of the bracket K' only without showing the blade assembly BAS') that shows the pivot pin N' secured to the main wall MW' of the bracket by a resistance weld or other weld NW'. As part of the tensioner second portion T2', the bracket K' further comprises a support flange TF' that projects outwardly from the main wall MW'. An end of the support flange TF' forms or defines a ramp R', and an outer wall OW' extends transversely from an outer end of the ramp R' and extends parallel to the main wall MW' such that a channel CH' (FIG. 1A) is defined between the main wall MW', the outer wall OW', and the ramp R'.

Figure 1C:
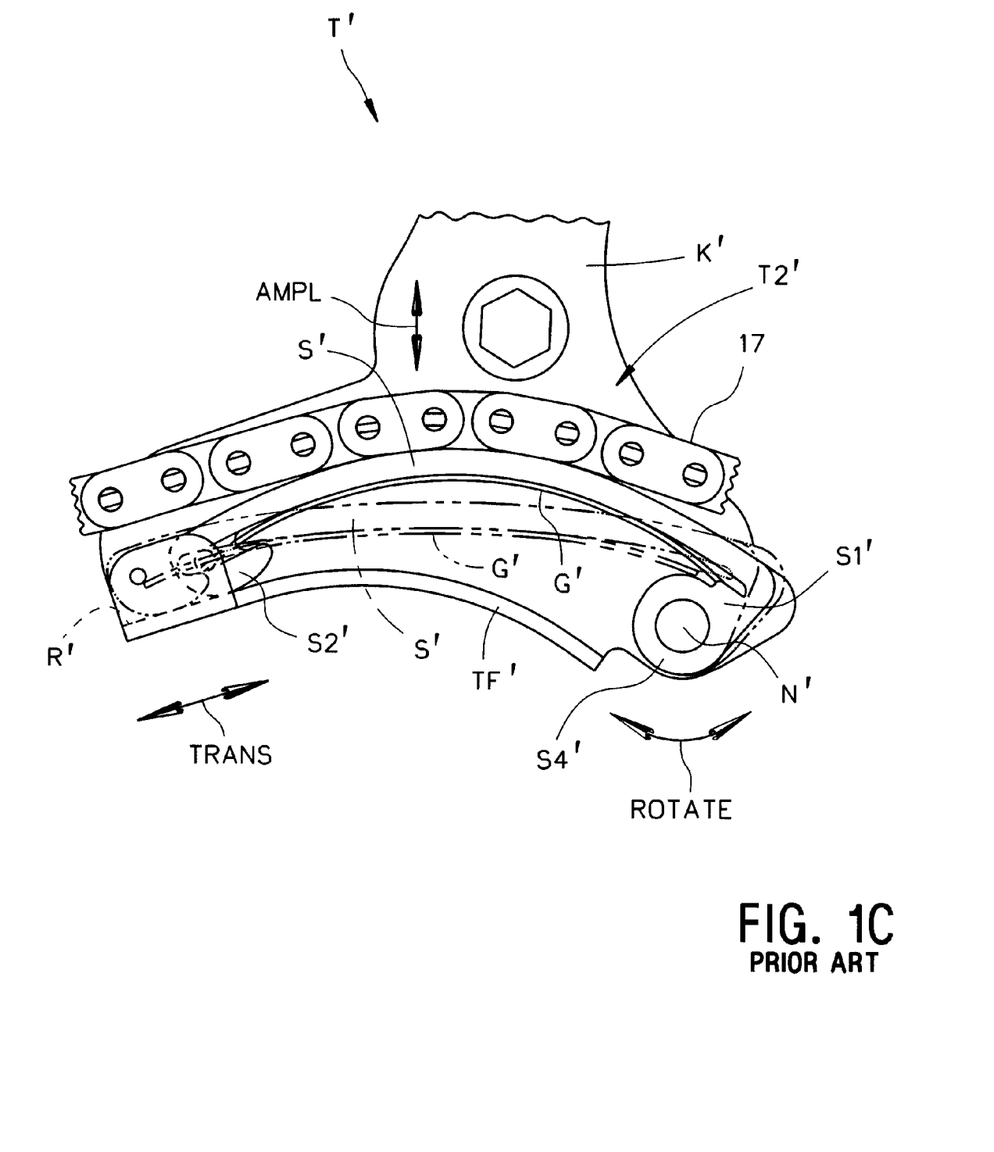
FIG. 1C is a partial view of the known tensioner that shows operative movement of the blade assembly using solid lines for a first (bowed) state of the blade assembly and phantom lines for a second (compressed) state of the blade assembly.

A known tensioner blade assembly BAS' is operatively connected to the bracket K' and includes a polymeric or "plastic" shoe S' and a metal spring G' releasably connected to the shoe S'. A first or pivot end S1' of the blade assembly BAS' includes a boss or barrel S4' that includes pivot bore SB' that is slidably received onto the pivot pin N'. An opposite second or free end S2' of the blade assembly BAS' is located in the channel CH' and supported on the ramp R'. A retaining pin RP' shown in FIG. 1 is used for shipping and handling only to secure the free end S2' on the ramp R' and is removed for operation of the blade assembly BAS' as shown in FIGS. 1B and 1C. The bracket K' maintains the blade assembly BAS' in its proper position with respect to the plane of the chain path while permitting sliding reciprocal translational motion of the second, free end S2' on the ramp R' as indicated by the arrow "TRANS" along with the related reciprocal angular or rotational movement of the blade assembly BAS' at the pivot end S1' as indicated by the arrow labeled "ROTATE" in response to changes in the tension and position of the slack strand 17 of the chain 15 and corresponding oscillatory movement of the slack strand 17 as indicated by the arrow "AMPL." FIG. 1C is a partial view of the tensioner T' that shows this operative movement of the blade assembly BAS' using solid lines for a first (bowed) position of the blade assembly BAS' and phantom lines for a second (compressed) position of the blade assembly BAS'.

The pivot pin N' can be replaced by a shoulder bolt or any other suitable fastener that extends through the shoe pivot bore SB' and through the bracket main wall MW' and that is threaded into the engine block EB or other associated support structure to allow rotation of the pivot end S1' of the shoe S' relative to the bracket K'. In either case, whether the tensioner T' comprises a pivot pin N' or a shoulder bolt, in certain engine environments, the packaging environment is limited such that a stamped steel bracket with sufficient structural integrity cannot be packaged in the available space, or a stamped steel bracket K' is sometimes disfavored due to the required fixing/mounting point positions or for other packaging or design related reasons. As such, it has been deemed desirable to provide an alternative tensioner and tensioner bracket structure.

SUMMARY

In accordance with one embodiment of the present development, a blade-type chain tensioner comprises a bracket including a main wall, a ramp projecting from the main wall, and a pivot pocket including an internal concave pivot surface. A tensioner blade assembly is operatively connected to the bracket. The tensioner blade assembly includes a polymeric shoe and a spring connected to the shoe. The shoe includes a free end supported on the ramp, a pivot end engaged with the pivot pocket, and a central body that extends between the free end and the pivot end. The pivot end of the shoe includes a pivot barrel including an external convex pivot surface. The pivot barrel is engaged with the pivot pocket and the external pivot surface of the pivot barrel is slidably abutted with the internal pivot surface of the pivot pocket such that the pivot barrel is reciprocally angularly movable in the pivot pocket.

In accordance with another embodiment of the present development, a blade-type chain tensioner comprises a bracket including a ramp and a pivot pocket. The pivot pocket includes a concave pivot surface. A blade assembly is operatively connected to the bracket. The blade assembly comprises a polymeric shoe including a first end, a second end, and a central body that extends between the first and second ends. The blade assembly further comprises a metal spring including a first end connected to the first end of the polymeric shoe and a second end connected to the second end of the polymeric shoe. The first end of the shoe includes a pivot barrel with a convex pivot surface. The pivot barrel is engaged with the pivot pocket such that the convex pivot surface of the pivot barrel is slidably abutted with the concave pivot surface of the pivot pocket to allow reciprocal angular movement of the pivot barrel in the pivot pocket. The second end of the shoe is supported on the ramp for reciprocal translational movement on the ramp. The concave pivot surface of the pivot pocket includes a region that extends for greater that 180 degrees around an outside diameter of the pivot barrel convex pivot surface to capture the pivot barrel in the pivot pocket.

In accordance with another example, a chain tensioner device comprises a bracket including: (i) a pivot pocket comprising a concave pivot surface that is defined by a cylindrical arc surface segment that extends circumferentially about a central axis; and, (ii) a support ramp. A blade assembly is secured to the bracket and comprises a shoe and a spring connected to the shoe. The shoe includes a pivot end comprising a convex pivot surface. The pivot end is engaged with the pivot pocket such that the convex pivot surface is abutted with the concave pivot surface of the pivot pocket. The shoe also includes a free end spaced from the pivot end and supported on the support ramp.

In accordance with another aspect of the present development, a method of assembling a chain tensioner device includes operatively connecting a tensioner blade assembly to a bracket by a sliding a pivot barrel of the tensioner blade assembly into a pivot pocket axially along a central axis of the pivot pocket such that an external pivot surface of the pivot barrel that comprises a convex cylindrical arc segment surface and an internal pivot surface of the pivot pocket that comprises a concave cylindrical arc segment surface are slidably abutted with each other and are arranged coaxially about the central axis. The tensioner blade assembly is then pivoted about the central axis to move a free end of the tensioner blade assembly into contact with a support ramp portion of the bracket.

DETAILED DESCRIPTION

According to one aspect of the present development, a blade-type chain tensioner includes a new bracket formed by injection molding a polymer or other polymeric or composite material such that the bracket includes a pocket pivot feature to permit relative rotation between the bracket and the pivot end of a tensioner blade assembly connected to the bracket. The pocket pivot feature includes a locking tab that captures the pivot end of the tensioner blade assembly to the bracket. Fiber glass filler or other filler material known in the art is normally added to the base polymer resin from which the bracket is defined (e.g., nylon or other resin) for improved strength of the bracket. The exemplary bracket provides advantages over known polymer brackets and over known brackets K' defined from steel stampings such as that described above in relation to FIGS. 1-1C.

Figure 2A:
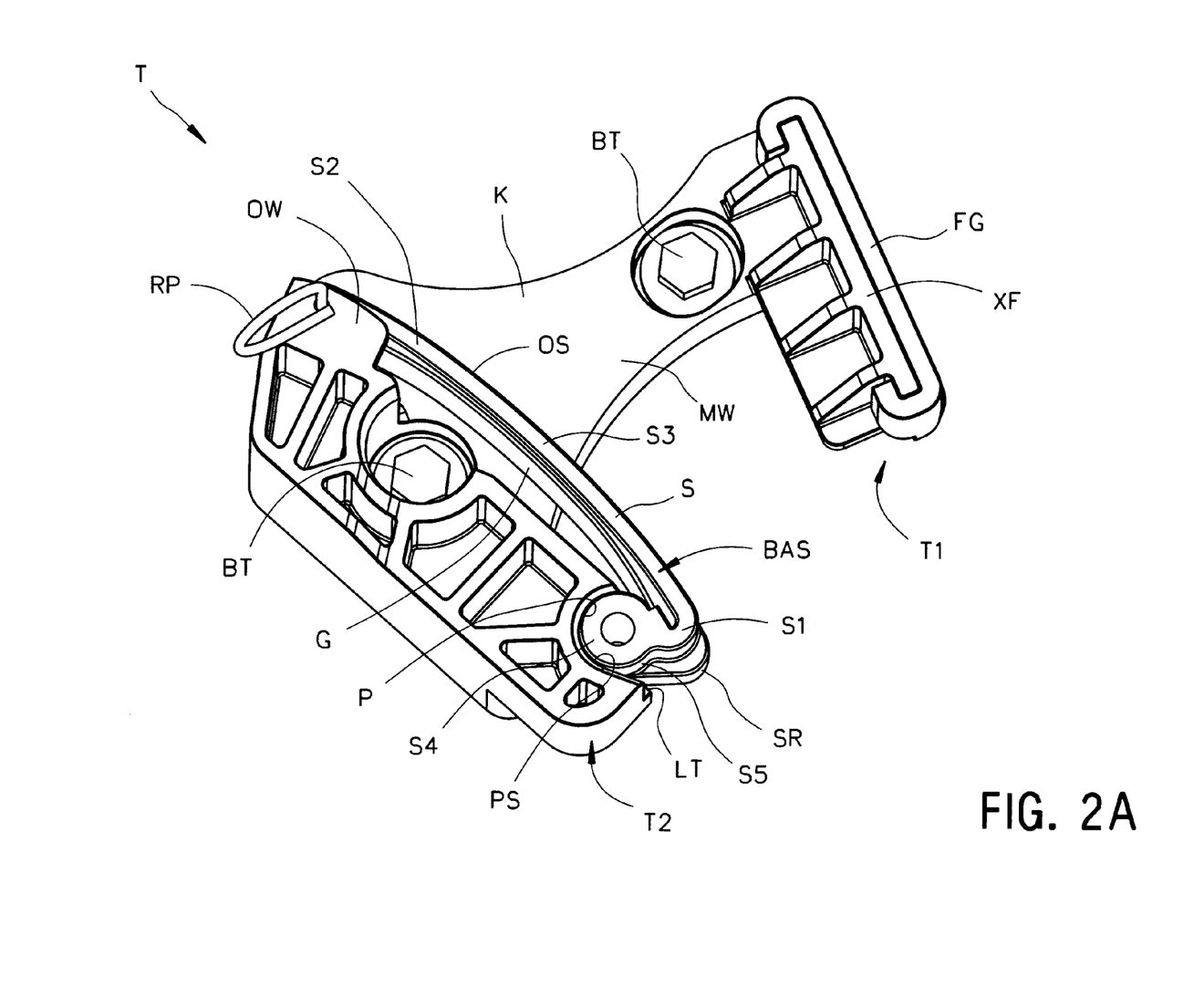
FIG. 2A shows a front isometric view of a tensioner provided in accordance with an exemplary embodiment of the present development.
Figure 2B:
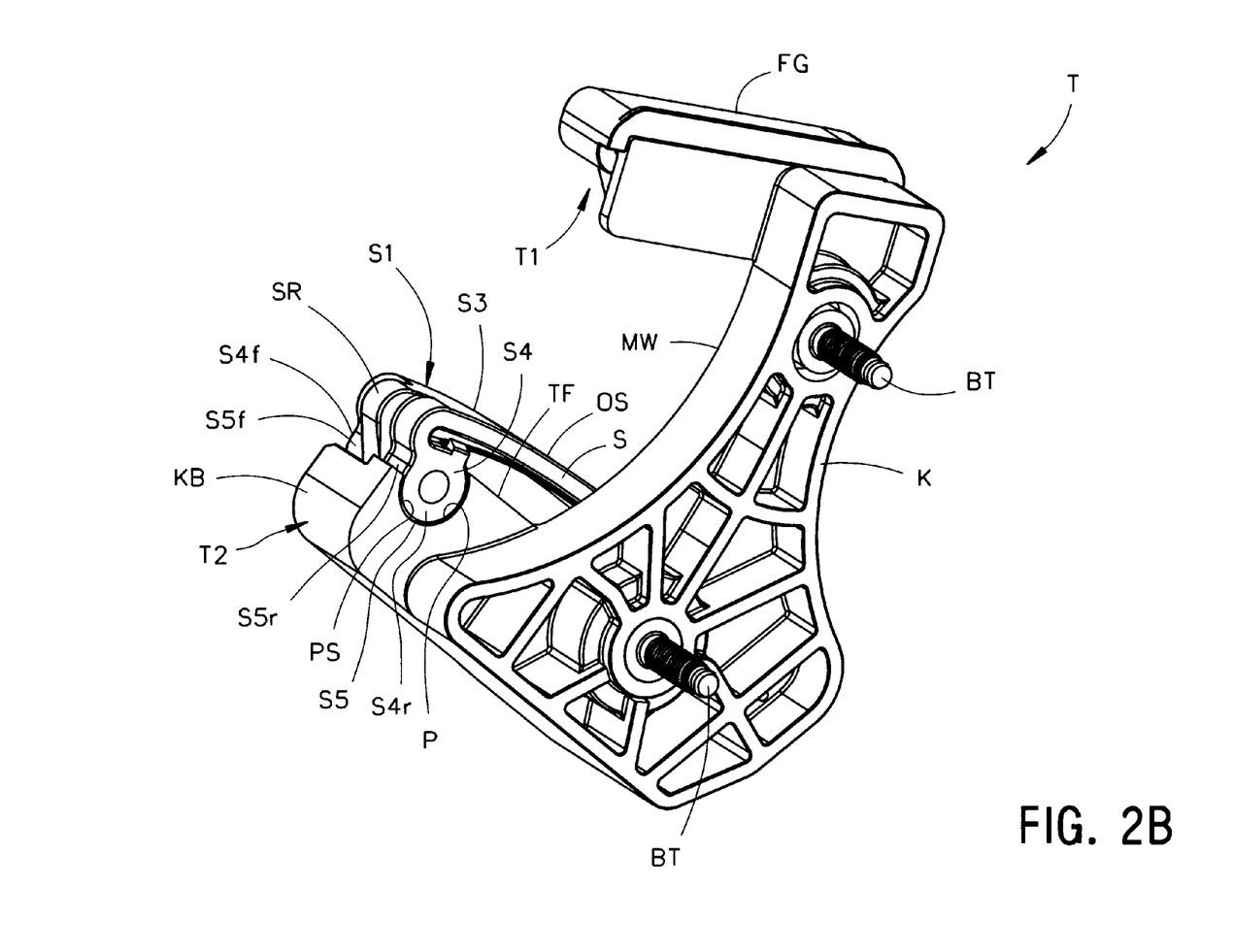
FIG. 2B provides a rear isometric view of the tensioner of FIG. 2A.
Figure 3:
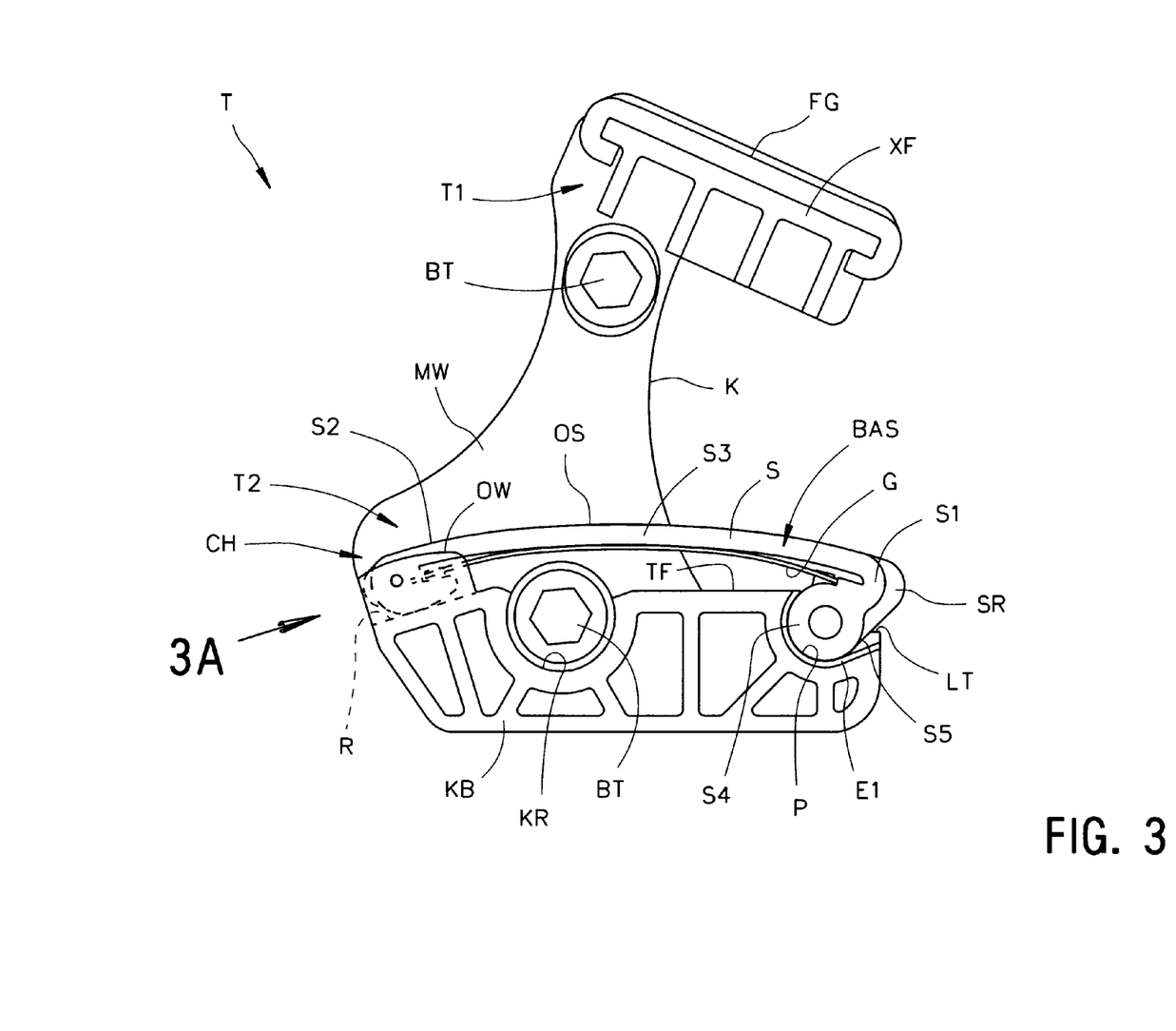
FIG. 3 shows a front view of the tensioner of FIG. 2A.
Figure 3A:
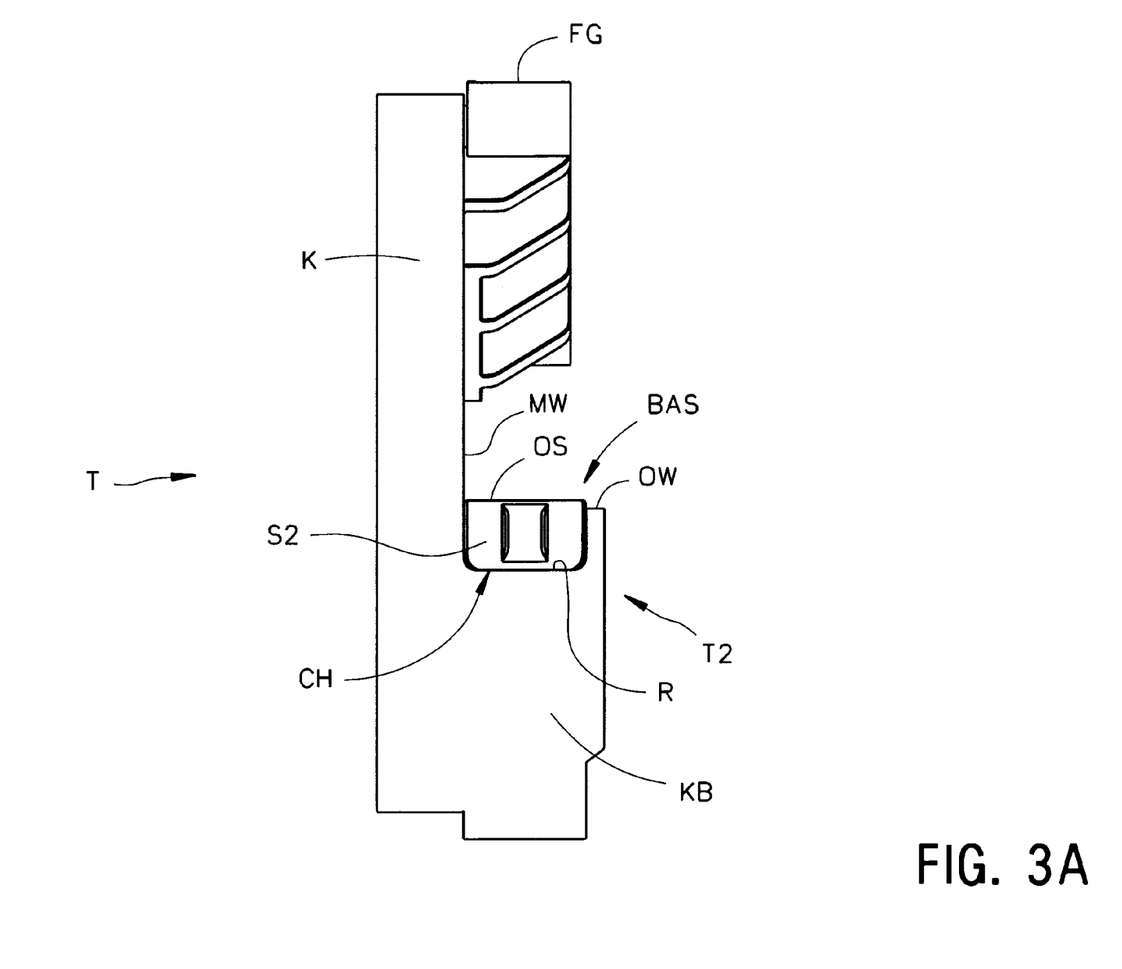
FIG. 3A shows a side view of the tensioner as taken according to the arrow 3A of FIG. 3.

More particularly, FIG. 2A shows a front isometric view of an assembled tensioner T provided in accordance with the present development, and FIG. 2B provides a rear isometric view of the tensioner T. FIG. 3 shows a front view of the tensioner T, and FIG. 3A shows a side view of the tensioner T as taken according to the arrow 3A in FIG. 3. FIG. 2A shows a removable pin RP temporarily connected to the tensioner T for shipping and handling purposes. The removable pin RP is removed for operative use of the tensioner T.

The tensioner T includes a bracket K defined from a nylon or other suitable polymeric or "plastic" material that typically includes glass fiber filler or other filler added thereto. In the illustrated embodiment, the bracket K is a one-piece structure formed by injection molding or other like process. The bracket K includes a main wall MW. The tensioner T includes optional first portion or fixed guide portion T1 connected to a first end of the main wall MW, and a second portion or tensioner portion T2 connected to a second end of the main wall MW.

The first portion T1 comprises a fixed guide flange XF that projects transversely from the main wall MW and that is engaged with and supports a fixed chain guide FG also defined from a polymeric resinous material. The fixed chain guide FG includes a guide face that slidably engages and supports the taut strand 16 of the chain 15 as described above in relation the known tensioner T' as shown in FIG. 1B.

The second portion T2 of the tensioner T comprises a support flange or support ledge TF that projects outwardly from the main wall MW. Referring also to FIG. 3A, an outer end of the support ledge TF forms or defines a ramp R, and an outer wall OW extends transversely from an outer end of the ramp R parallel to the main wall MW such that a channel CH is defined between the main wall MW, the outer wall OW, and the ramp R. In the illustrated embodiment, the support ledge TF is provided by a surface of a support block KB portion of the bracket K that is connected to and extends or projects outwardly from the main wall MW.

A tensioner blade assembly BAS provided in accordance with the present development is operatively connected to the bracket K as part of the second tensioner portion T2. The tensioner blade assembly BAS comprises a polymeric blade or "shoe" S and a metal spring G connected to the shoe S. The shoe S is a one-piece molded polymeric construction and the spring G is a one-piece spring steel part or similar leaf-spring structure. The shoe S includes pivot end S1 and a free end S2 that define respective slots SL1,SL2 (FIG. 5) for respectively receiving and retaining opposite ends of the spring G. The shoe S includes a central body S3 that extends along a chain travel axis between and interconnects the pivot and free ends S1,S2. An upper or outer surface OS of the central body S3 provides a chain contact surface for being slidably engaged by a chain being tensioned. The central body S3 includes a lower or inner surface located opposite the outer surface OS and that is contacted by an arched central portion of the spring G. The free end S2 of the shoe S is located in the channel CH and is supported on the ramp R (see also FIG. 3A).

The tensioner apparatus T is installed as part of an engine timing chain drive system in the same manner as described above for the known tensioner apparatus T' and as shown in FIG. 1B. One or more bolts BT are used to secure the bracket K to the associated engine block or other associated support structure of FIG. 1B such that a taut strand 16 of the chain 15 is guided by the fixed guide face FG and a slack strand 17 of the chain 15 is tensioned by the blade assembly BAS. As with the known tensioner T' and its blade assembly BAS', the chain slack strand 17 sliding on the outer surface OS of the blade assembly BAS will cause the central body S3 of the shoe S to flatten and bow in an oscillatory manner such that the free end S2 of the shoe slides back-and-forth on the ramp R while the pivot end S1 of the shoe rotates or pivots with reciprocal angular movement in first and second angular directions relative to the bracket K.

Figure 4A:
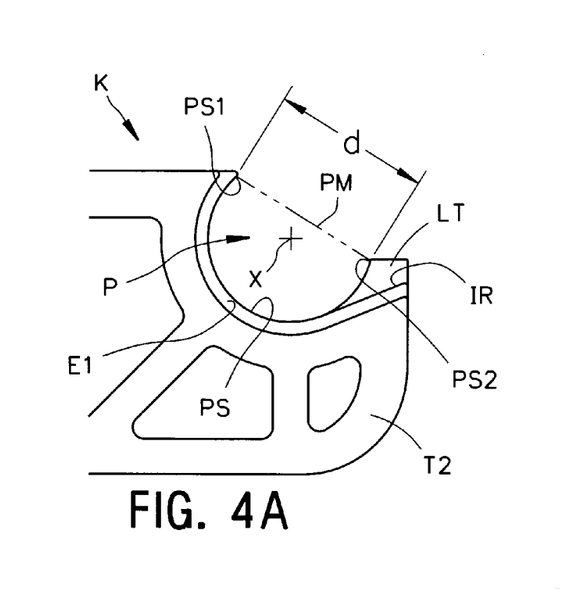
FIGS. 4A and 4B respectively provide greatly enlarged partial front and isometric views of the bracket portion of the tensioner shown in FIG. 2A.
Figure 4B:
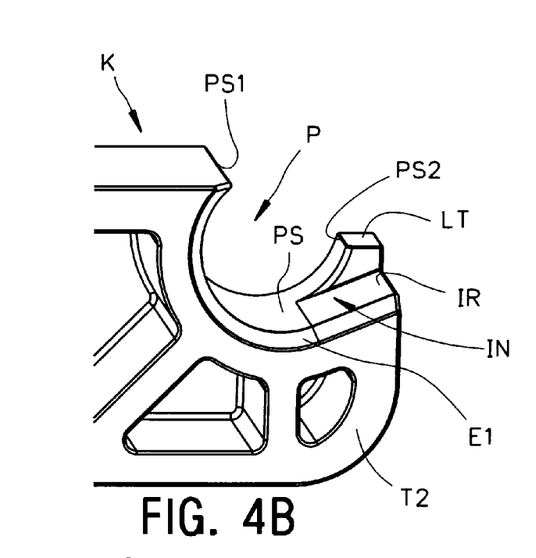

Unlike the known bracket K', the bracket K does not require a pivot pin N to rotatably support the pivot end S1 of the shoe S relative to the bracket K. Instead, the pivot end S1 of the shoe S is pivotally secured to the bracket K in a pivot pocket P of the bracket K to enable the required oscillatory angular rotation/pivoting of the pivot end S1 of the shoe S. FIGS. 4A and 4B provide greatly enlarged partial views of the bracket K in the region of the pivot pocket P. The pivot pocket P comprises a concave pivot surface PS that includes or is defined by a cylindrical arc segment surface, i.e., a cylindrical surface that extends for less than 360 degrees about an arc center axis X. The pivot pocket P thus includes or defines an open mouth PM of width "d" defined between opposite first and second circumferential ends PS1,PS2 of the pivot surface PS at a point on the pivot surface PS where the width "d" is minimized, i.e., the width "d" is the minimum width open mouth defined between opposite circumferential ends PS1, PS2 of the pivot surface PS at the longest circumferential extent of the pivot surface. The pivot pocket P is defined in the support block KB, through or adjacent the support ledge TF at a location spaced from but aligned with the ramp R along the chain travel axis. In the illustrated embodiment, the support block KB includes a recess KR to accommodate one of fastener bolts BT, and the recess KR intersects the support ledge TF and divides it into a first portion that comprises the ramp R and a second portion in which or adjacent to which the pivot pocket P is defined. The concave pivot surface PS is sometimes referred to herein as the internal pivot surface.

Figure 4C:
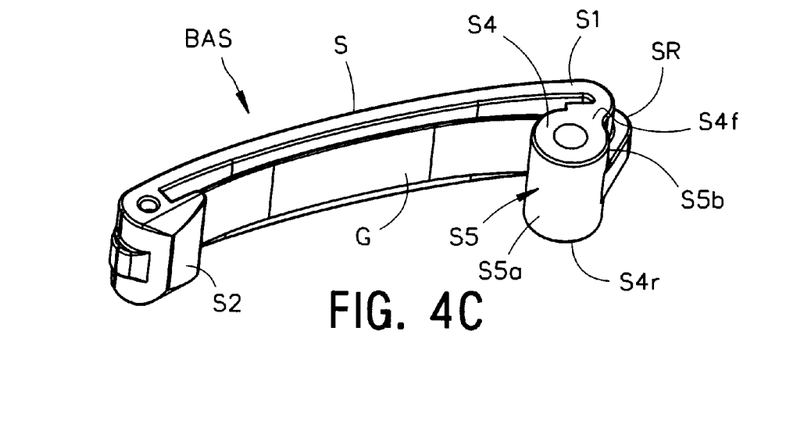
FIG. 4C is an isometric view of the blade assembly portion of the tensioner of FIG. 2A.

With reference also to FIG. 4C where the blade assembly BAS is shown separately, the pivot end S1 of the shoe S correspondingly includes a pivot boss or pivot barrel S4 comprising a convex external cylindrical arc segment pivot surface S5, which comprises a cylindrical surface that extends circumferentially for less than 360 degrees. In a primary region S5a of the external pivot surface S5, it extends substantially continuously from a front edge S4f to a rear edge S4r of the pivot barrel S4. In a secondary region S5b, the external pivot surface S5 is divided into front and rear sections S5f,S5r (see also FIG. 2B) by an external strengthening rib SR that projects outwardly from the pivot barrel S4 in the region where the central portion S3 joins the pivot barrel S4, typically midway between the front and rear edges S4f,S4r of the pivot barrel. The front and rear sections S5f,S5r of the external pivot surface extend from the external strengthening rib to the front and rear edges, respectively.

Figures 6A, 6B:
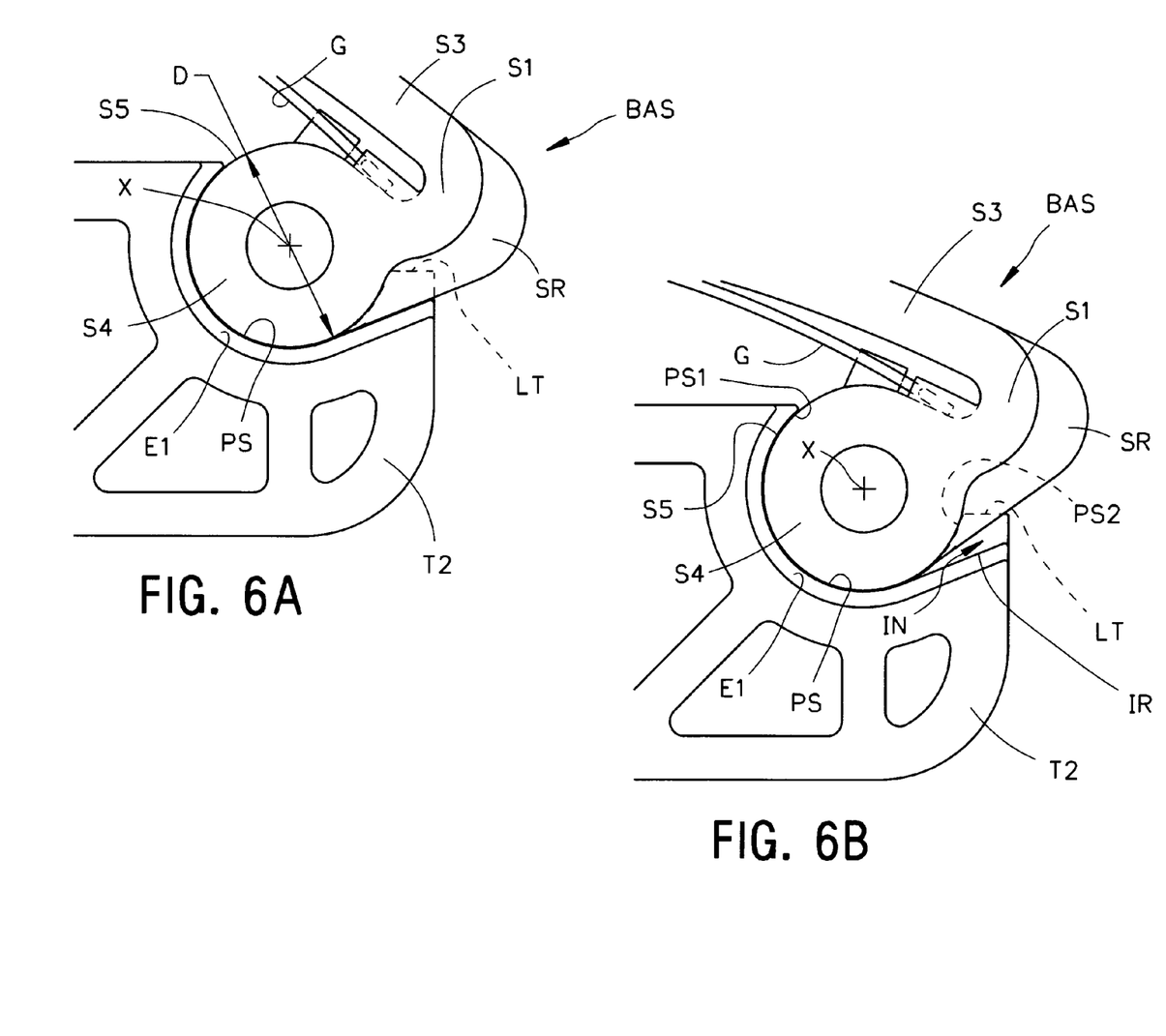
FIGS. 6A and 6B are similar to FIG. 4A, but also provide partial views of the blade assembly in its install position and its operative position, respectively.

As shown in FIG. 6A, an outside diameter D is defined between any two diametrically opposed locations on said external pivot surface S5. The internal pivot surface PS of the pivot pocket P is conformed and dimensioned to correspond to the external pivot surface S5 of the pivot barrel S4, such that the outside diameter D defined by the pivot surface S5 fits closely into the pivot pocket P, with the external convex pivot surface S5 of the barrel S4 and the internal concave pivot surface PS of the pivot pocket P arranged coaxially about the pocket central axis X and slidably engaged or slidably abutted with each other. As such, the pivot barrel S4 is able to rotate or pivot angularly in a reciprocal manner in first and second directions about the central axis X relative to the bracket K. As used herein, the term "rotate" is not intended to mean 360 degrees of rotation. Instead, "rotation" is intended to mean angular movement along an arc segment, which will be less than 360 degrees.

Preferably, the pivot pocket P is defined such that the width "d" of the open mouth PM (FIG. 4A) is less than the pivot barrel outside diameter D, because the pivot surface PS extends for more than 180 degrees from its first end PS1 to its second end PS2 at its maximum circumferential length. In such case, the pivot barrel S4 is installed in the pivot pocket P by axial sliding movement of the pivot barrel S4 into the pivot pocket P along the pivot axis X. The pivot barrel S4 is interlocked to the bracket K and cannot move in any direction transverse to the pivot axis X, but the pivot barrel S4 can pivot relative to the bracket K in a reciprocal manner about the pivot axis X. Because of the presence of the external strengthening rib SR projecting outwardly from the pivot barrel S4, a portion of the second end PS2 of the internal concave pivot surface PS is relieved or removed to define an install notch IN (FIG. 4B) including an install ramp IR that provides clearance for the external rib SR of the shoe S when the pivot barrel S4 is moved axially along the pivot axis X into the pivot pocket P during its installation. The remaining portion of the second end PS2 of the pivot surface PS defines a locking tab LT that projects outwardly relative to the install ramp IR. The install ramp IR is sized such that upon axial insertion of the pivot barrel S4 into the pivot pocket P, the external rib SR will abut the locking tab LT when the pivot barrel S4 is fully axially installed into the pivot pocket P.

Figure 5:
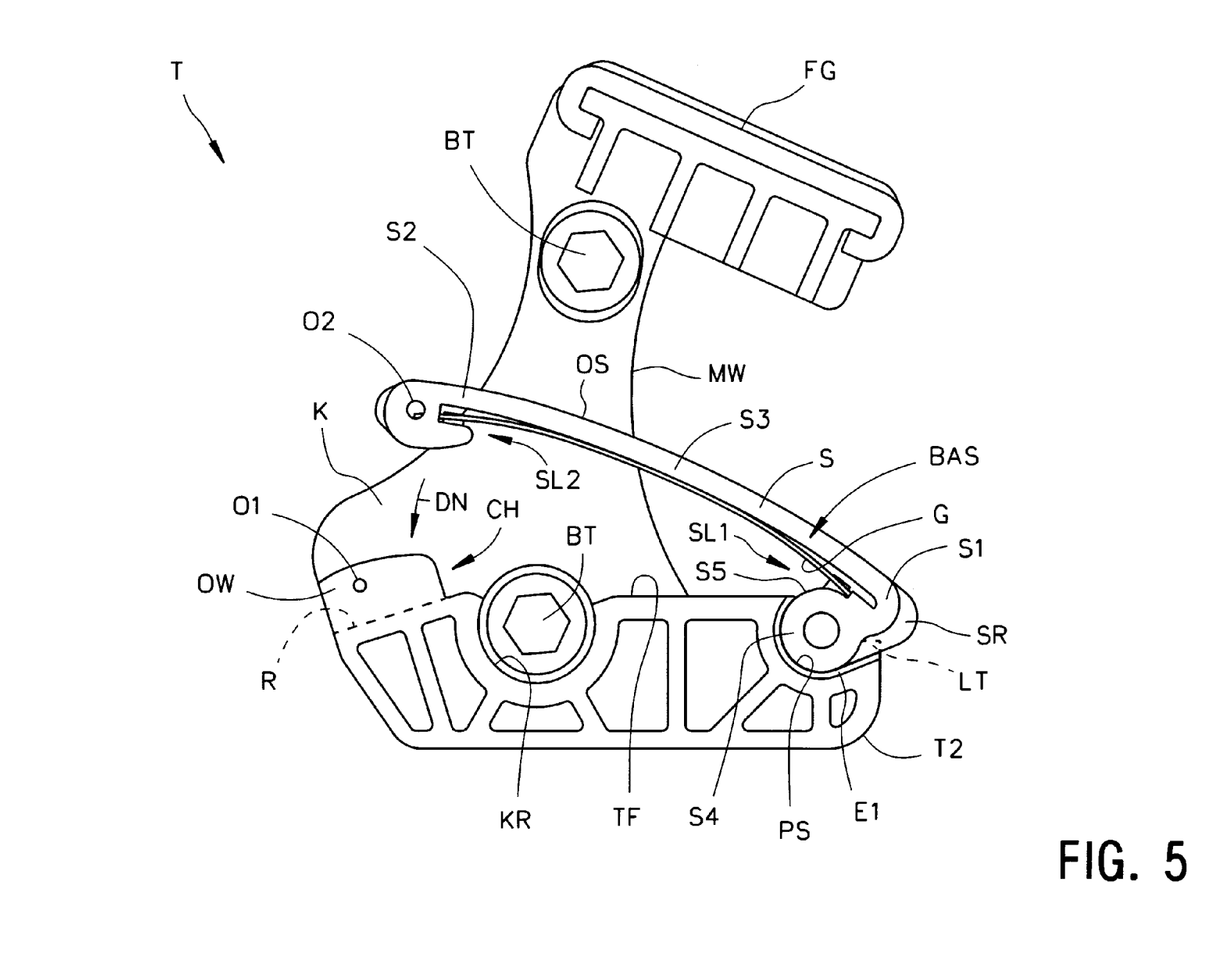
FIG. 5 is a front view of the tensioner that is similar to FIG. 3, but shows the blade assembly partially installed on the bracket.

FIGS. 5 and 6A show the tensioner blade assembly BAS oriented in an install position as required for axial insertion of the pivot barrel S4 into the pivot pocket P. The illustrated install position, with the free end S2 of the shoe positioned spaced from the outer wall OW of the channel CH, is required in order for the free end S2 of the shoe to move past or "clear" the outer channel wall OW when the pivot barrel S4 is axially inserted into the pivot pocket P. In this install position, the external rib S5 is located parallel to and abutted with the "install" ramp IR such that the install ramp IR provides a reference location for the proper angular position of the tensioner blade assembly BAS for its installation. When the blade pivot barrel S4 is fully advanced axially into the pivot pocket P along the pivot axis X, the external rib SR thereof will be located adjacent and/or abut the locking tab LT, and the free end S2 of the shoe S will be located adjacent and/or abut the main wall MW of the bracket B. The pivot barrel S4 is then fully contained and secure in the pivot pocket P. Next, the free end S2 of the shoe S is rotated in the direction of the arrow DN in FIG. 5 until it contacts the bracket ramp surface R and the removable pin RP is then inserted through an opening O1 defined in the outer wall OW and an aligned opening O2 defined in the free end S2 of the shoe, in order to secure the blade assembly BAS temporarily in place for shipping and during subsequent installation to the engine. As noted above, the pin RP is later removed for use of the tensioner T. The pivot pocket P can optionally include a lead-in chamfer E1 adjacent its front edge to facilitate sliding insertion of the shoe pivot barrel S4.

Figure 7:
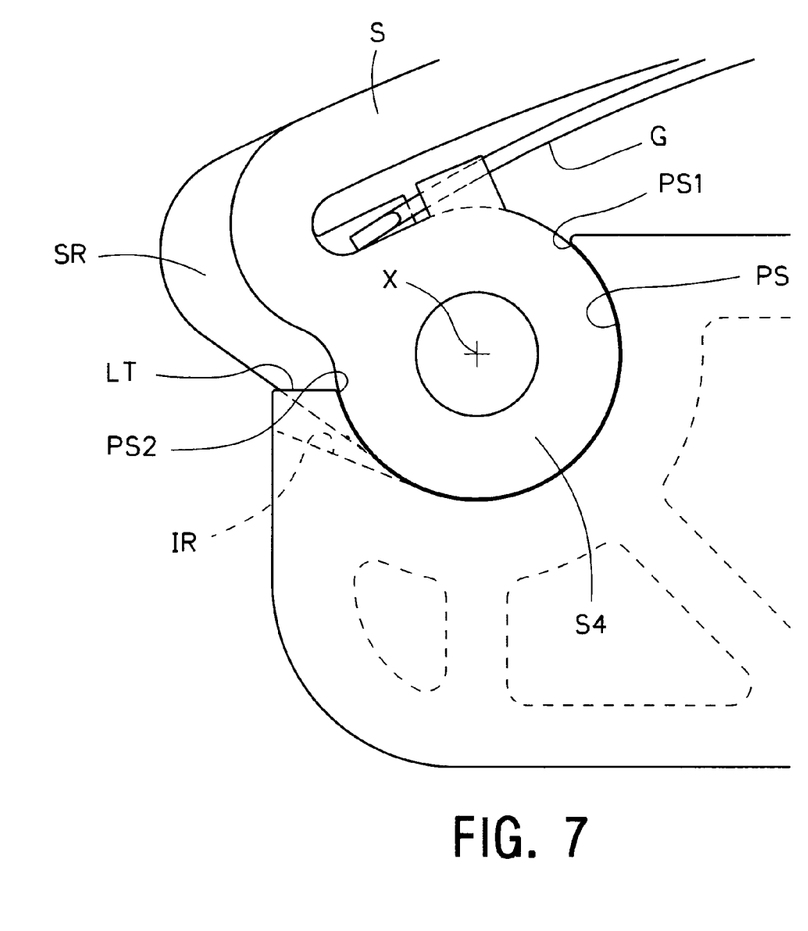
FIG. 7 is a greatly enlarged rear view that corresponds to the front view of FIG. 6B.

FIGS. 6B and 7 show the tensioner blade assembly BAS installed in its operative position on the bracket K. It can be seen in FIG. 6B that when the tensioner blade assembly BAS is installed in its operative position, at least part of the external strengthening rib SR of the shoe S extends beyond the internal concave pivot surface PS of the pivot pocket P into the install notch IN and lies adjacent the locking tab LT. As such, the install notch IN provides clearance for the external strengthening rib SR.

The invention has been described with reference to preferred embodiments. Modifications and alterations will occur to those of ordinary skill in the art to which the invention pertains, and it is intended that the invention be construed as encompassing all such modifications and alterations.

The invention claimed is:

1. A blade-type chain tensioner comprising:
   a bracket comprising a main wall, a ramp projecting from said main wall, and a pivot pocket comprising an internal concave pivot surface, wherein said internal pivot surface of said pivot pocket extends a maximum circumferential extent that is less than 360 degrees between first and second opposite ends of said internal pivot surface such that an open mouth of width "d" is defined between said first and second opposite ends of said internal pivot surface;
   a tensioner blade assembly operatively connected to said bracket, said tensioner blade assembly comprising a polymeric shoe and a spring connected to the shoe, said shoe comprising a free end supported on said ramp, a pivot end engaged with said pivot pocket, and a central body that extends between said free end and said pivot end;
   said pivot end of said shoe comprising a pivot barrel including an external convex pivot surface, wherein said pivot barrel is engaged with said pivot pocket and said external pivot surface of said pivot barrel is slidably abutted with said internal pivot surface of said pivot pocket such that said pivot barrel is reciprocally angularly movable in said pivot pocket, said external pivot surface of said pivot barrel comprising an outside diameter "D" and said width "d" of said open mouth being less than said outside diameter "D" of said external pivot surface, wherein a portion of the second end of said internal pivot surface of said pivot pocket is removed to define an install notch.

2. The blade-type chain tensioner as set forth in claim 1, wherein said pivot end of said shoe further comprises an external strengthening rib that projects outwardly from said pivot barrel, and wherein at least a portion of said external strengthening rib is located in said install notch.

3. The blade-type chain tensioner as set forth in claim 2, wherein said install notch is includes an install ramp and a locking tab that projects outwardly from said install ramp, and wherein said external strengthening rib lies adjacent said locking tab.

4. The blade-type chain tensioner as set forth in claim 2, wherein said external convex pivot surface comprises:
   a primary region in which said external convex pivot surface extends substantially continuously from a front edge of said pivot barrel to a rear edge of said pivot barrel; and,
   a secondary region in which said external convex pivot surface is divided by said external strengthening rib into a front section that extends between said external strengthening rib and said front edge of said pivot barrel and a rear section that extends between said external strengthening rib and said rear edge of said pivot barrel.

5. A blade-type chain tensioner comprising:
   a bracket comprising a main wall, a ramp projecting from said main wall, and a pivot pocket comprising an internal concave pivot surface, wherein said bracket comprises a support block that is connected to and extends outwardly from said main wall, wherein said ramp is provided by a surface of the support block;
   a tensioner blade assembly operatively connected to said bracket, said tensioner blade assembly comprising a polymeric shoe and a spring connected to the shoe, said shoe comprising a free end supported on said ramp, a pivot end engaged with said pivot pocket, and a central body that extends between said free end and said pivot end;
   said pivot end of said shoe comprising a pivot barrel including an external convex pivot surface, wherein said pivot barrel is engaged with said pivot pocket and said external pivot surface of said pivot barrel is slidably abutted with said internal pivot surface of said pivot pocket such that said pivot barrel is reciprocally angularly movable in said pivot pocket.

6. The blade type chain tensioner as set forth in claim 5, wherein said internal pivot surface of said pivot pocket and said external pivot surface of said pivot barrel comprise respective cylindrical arc segment surfaces.

7. The blade type chain tensioner as set forth in claim 6, wherein said internal pivot surface of said pivot pocket is defined about a central axis, and wherein said internal pivot surface of said pivot pocket and said external pivot surface of said pivot barrel are arranged coaxially about the central axis.

8. The blade-type chain tensioner as set forth in claim 5, wherein said pivot pocket is formed in said support block.

9. The blade-type chain tensioner as set forth in claim 5, wherein:
   said bracket comprises an outer wall that extends transversely from an outer end of the ramp such that said bracket comprises a channel located between said main wall, said ramp, and said outer wall; and
   said free end of said shoe is located in said channel.

10. A chain tensioner device comprising:
    a bracket that includes: (i) a pivot pocket comprising a concave pivot surface that is defined by a cylindrical arc surface segment that extends circumferentially about a central axis; and, (ii) a support ramp;
    a blade assembly secured to the bracket, said blade assembly comprising a shoe and a spring connected to the shoe, said shoe including a pivot end comprising a convex pivot surface, said pivot end engaged with the pivot pocket such that the convex pivot surface is abutted with the concave pivot surface of the pivot pocket, wherein a portion of said pivot pocket extends for greater than 180 degrees around said convex pivot surface of said shoe such that said pivot end of said shoe is movable relative to said pivot pocket angularly about the central axis while said pivot pocket prevents movement of the pivot end of the shoe in a direction transverse to the central axis, said shoe including a free end spaced from the pivot end and supported on the support ramp, wherein said free end of said shoe is selectively movable to an install position where said free end is spaced from said ramp, and wherein said pivot end of said shoe is axially movable in said pocket along said central axis when said free end of said shoe is located in said install position.

* * * * *